US012119548B2

(12) United States Patent
Hino

(10) Patent No.: US 12,119,548 B2
(45) Date of Patent: Oct. 15, 2024

(54) SLOT ARRAY ANTENNA

(71) Applicant: Furuno Electric Co., Ltd., Nishinomiya (JP)

(72) Inventor: Akihiro Hino, Kakogawa (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 0 days.

(21) Appl. No.: 17/970,690

(22) Filed: Oct. 21, 2022

(65) Prior Publication Data

US 2023/0411858 A1 Dec. 21, 2023

(30) Foreign Application Priority Data

Jun. 17, 2022 (EP) .................................... 22179696

(51) Int. Cl.
*H01Q 13/02* (2006.01)

(52) U.S. Cl.
CPC ............................... *H01Q 13/0233* (2013.01)

(58) Field of Classification Search
CPC ............... H01Q 13/02; H01Q 13/0233; H01Q 13/0283; H01Q 15/24; H01Q 19/028
See application file for complete search history.

(56) References Cited

U.S. PATENT DOCUMENTS

2005/0040993 A1* 2/2005 Hidai ................. H01Q 13/0233 343/770
2011/0181482 A1* 7/2011 Adams ................. H01Q 25/001 343/771
2013/0009805 A1* 1/2013 Miyagawa ......... H01Q 13/0233 342/179
2019/0305437 A1* 10/2019 Hamminga ........ H01Q 13/0233

FOREIGN PATENT DOCUMENTS

| | | | |
|---|---|---|---|
| CN | 208045698 U | 11/2018 |
| GB | 1 437 977 A | 6/1976 |
| JP | 49-63829 U | 6/1974 |
| JP | 63-72911 U | 5/1988 |
| JP | 3-69914 U | 7/1991 |
| JP | 7-1617 U | 1/1995 |
| JP | 2012-4700 A | 1/2012 |

OTHER PUBLICATIONS

Anim et al, Jul. 12, 2021, Compact Slotted Waveguide Antenna Array Using Staircase Model of Tapered Dielectric-Inset Guide for Shipboard Marine Radar.*
Extended European Search Report issued Nov. 10, 2022 in correspoding European Patent Application No. 22179696.4, 8 pages.

* cited by examiner

*Primary Examiner* — Ricardo I Magallanes
*Assistant Examiner* — Aladdin Abdulbaki
(74) *Attorney, Agent, or Firm* — XSENSUS LLP

(57) ABSTRACT

A slot array antenna that includes radiation, base, and grating plates is disclosed. The radiation plate has a first surface having multiple slots to radiate radio waves, second and third surfaces forming a horn shape, and proximal and distal connecting members. The base plate has first, second, and third surfaces forming a U-shape, and notches. The connecting members of the radiation are removably insertable into the notches to assemble the slot array antenna for the radiation of the radio waves and to suppress noise signals.

11 Claims, 8 Drawing Sheets

6

SLOT ARRAY ANTENNA

CROSS-REFERENCE TO RELATED APPLICATION(S)

This application claims priority under 35 U.S.C. § 119 to European Patent Application No. 22179696.4, which was filed on Jun. 17, 2022, the entire disclosure of which is hereby incorporated by reference.

TECHNICAL FIELD

The present disclosure mainly relates to a marine radar for navigation of a ship, and more specifically to a slot array antenna for the marine radar.

BACKGROUND

Patch antenna and waveguide slot array antenna are main stream antennas used for marine radar. Conventional marine antennas generally use a rectangular waveguide with multiple slots or an antenna with multiple patch antennas equipped with horns to improve directivity. Since the patch antenna is made on the substrate, it is cheap and excellent in the manufacturability, but the gain is low because of large loss. For extension of the detection range of radars, such as marine radars used for navigation of a ship, the demand for increasing gains has been increasing by reducing the losses in recent years and, and in order to meet these demands, low-loss and highly efficient array antennas are desired as antenna devices applied to radars. Waveguide slot array antennas are one example of such low-loss and highly efficient antenna systems.

A slot array antenna is an antenna whose waveguide is slotted. A cover is necessary for a terminal part of the waveguide. Further, a short-circuit plate (metal plate) is used for the resonant type, and a terminator (radio wave absorber) is used for the traveling wave type. Since the waveguide is a rectangular tube, the lid must be separately manufactured and mounted. And, it is generally necessary to make the slot machining by grinding the waveguide with high accuracy. Since the lid is to be separately manufactured and mounted, and the slot machining is made by cutting the waveguide with high accuracy, and the manufacturing cost becomes effective. Thus, a waveguide slot array antenna has small loss and high gain, but require high precision processing and are expensive. Antennas that are easier to process than rectangular waveguides and have better performance than patch antennas are being researched and developed. Several conventional techniques have a feature processing multiple metal plates (metal sheets). However, each of these metal plates are required to be connected, and many fastening and securing elements, such as screws and the like must be used for the connection.

For the aforementioned reasons, there is a need for providing a slot array antenna that overcomes the problems of conventional patch antennas and waveguide slot array antennas.

SUMMARY

In an embodiment of the present disclosure, there is provided a slot array antenna including a radiation plate and a base plate. The radiation plate has a first surface that has a plurality of slots to radiate a radio waves, second and third surfaces that form a horn shape, and connecting members in a direction opposite to a radiating direction of the radio waves respectively at ends of the first surface of the radiation plate. The base plate having first, second, and third surfaces that form a U-shape, and first and second notches respectively at a vicinity of ends of the base plate. The radio waves are radiated between the horn shape. The connecting members of the radiation plate are removably insertable into the first and second notches, respectively, to assemble the slot array antenna for the radiation of the radio waves.

Additionally, or optionally, the first, second, and third surfaces of the base plate and the first surface of the radiation plate may form a waveguide.

Additionally, or optionally, the connecting members of the radiation plate may act as a short for the radio waves radiating out from the slots.

Additionally, or optionally, the connecting members of the radiation plate may have a rectangular shape.

Additionally, or optionally, a length of each of the connecting members of the radiation plate may be less than or equal to a depth of the U-shape of the base plate.

Additionally, or optionally, the base plate further may have third and fourth notches respectively at a vicinity of the ends of the base plate.

Additionally, or optionally, the slot array antenna further may comprise a grating plate having a grated surface and connecting members in a direction opposite to the radiating direction of the radio waves respectively at ends of the grated surface of the grating plate. The connecting members of the grating plate may be removably insertable into the third and fourth notches, respectively, to assemble the slot array antenna for the radiation of the radio waves and to suppress noise signals associated with the radiation of the radio waves.

Additionally, or optionally, the noise signals may be vertically polarized waves.

Additionally, or optionally, each of the base plate, the radiation plate, and the grating plate may have a plurality of holes for receiving fasteners to secure the base plate, the radiation plate, and the grating plate to each other.

Additionally, or optionally, the base plate may be provided with a feed point from where the radio waves are fed to the slot array antenna.

Additionally, or optionally, the feed point may be positioned at a center of the base plate.

Additionally, or optionally, the plurality of slots in the first surface of the radiation plate have odd number of slots.

Additionally, or optionally, a slot angle of a center slot of the plurality of slots and a distance to the feed point may be predetermined to feed each slot with a same phase of the radio waves.

In another aspect of the present disclosure, there is provided a method for assembling a slot array antenna. The method comprises forming a radiation plate having a first surface that has a plurality of slots to radiate a radio waves, second and third surfaces that form a horn shape, and connecting members in a direction opposite to a radiating direction of the radio waves respectively at ends of the first surface of the radiation plate. The method further comprises forming a base plate having first, second, and third surfaces that form a U-shape, and first and second notches respectively at a vicinity of ends of the base plate. The method further comprises removably inserting the connecting members of the radiation plate into the first and second notches, respectively, to assemble the slot array antenna for the radiation of the radio waves. The radio waves are radiated between the horn shape.

The slot array antenna of the present disclosure is composed of a combination of metal sheets that are manufactured by press working which does not require high-precise working. The assembly of the metal sheets is eased by providing connecting members in the radiation and grating plate and corresponding notches in the base plate. Thus, the radiation plate and the grating plate are assembled with the base plate to form the slot array antenna for radiating a radio waves. Thus, a highly sensitive antenna is realized at a cost equal to or less than that of a patch antenna by improving the manufacturability of a slot array antenna and increasing gains compared to conventional patch antennas.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

Figure 1:
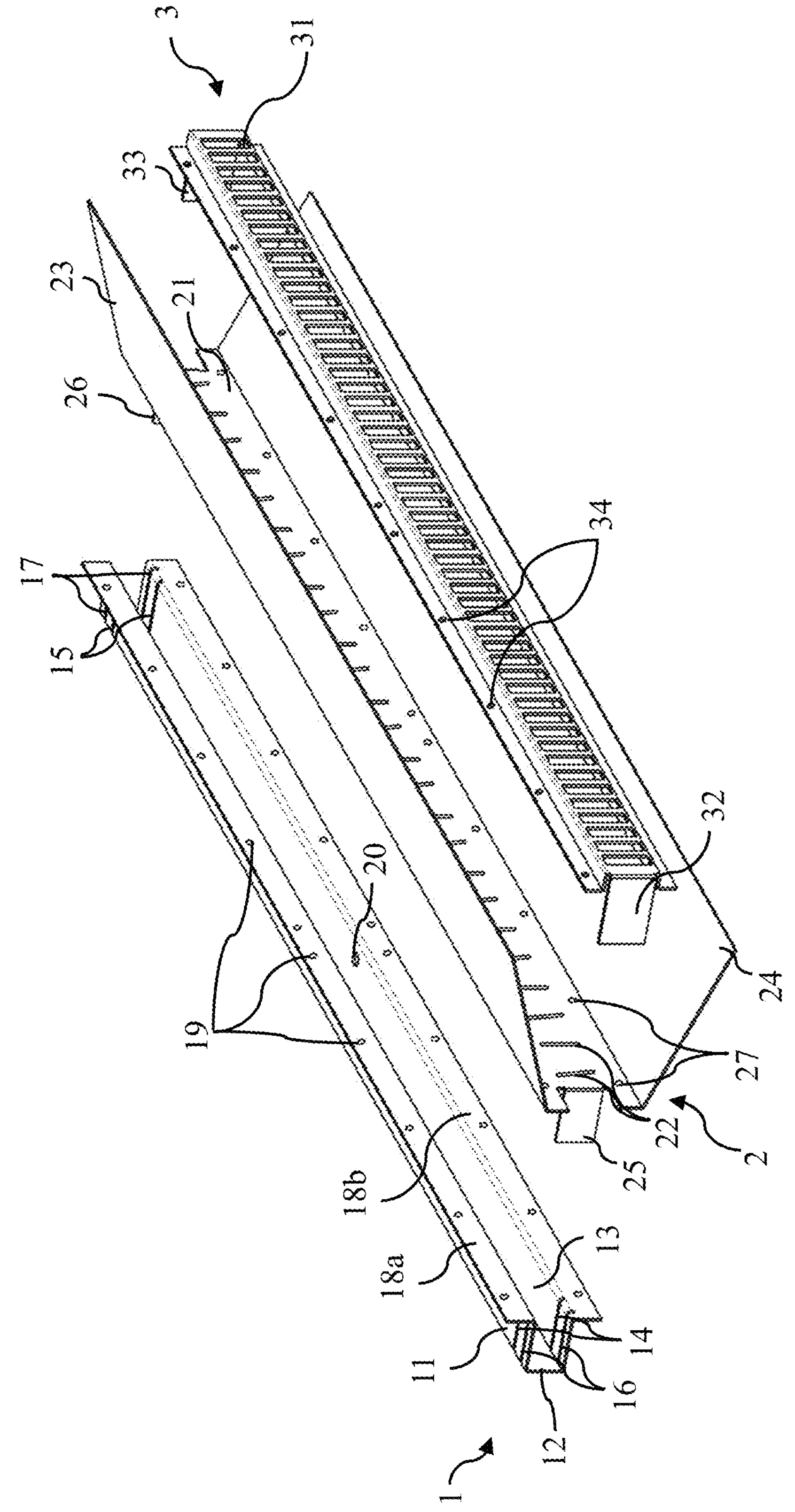
FIG. 1 illustrates a base plate, a radiation plate, and a grating plate of a slot array antenna according to one embodiment of the present disclosure.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

FIG. 1 illustrates a base plate 1, a radiation plate 2, and a grating plate 3 of a slot array antenna (shown later in FIG. 4) according to one embodiment of the present disclosure. The slot array antenna includes the base plate 1, the radiation plate 2, and the grating plate 3 which when assembled form the slot array antenna.

The base plate 1 has first, second, and third surfaces 11, 12, and 13 that form a U-shape as shown in FIG. 1. The base plate 1 further has first and second notches 14 and 15 at a vicinity of proximal and distal ends of the base plate 1, respectively. In one embodiment, the first notch 14 is formed such that each of the first and third surfaces 11 and 13 of the base plate 1 has a slit at the vicinity of corresponding proximal end. Similarly, the second notch 15 is formed such that each of the first and third surfaces 11 and 13 of the base plate 1 has a slit at the vicinity of corresponding distal end. A width of each slit is greater than or equal to a thickness of the radiation plate 3.

The base plate 1 further has third and fourth notches 16 and 17 at a vicinity of proximal and distal ends of the base plate 1, respectively. In one embodiment, the third notch 16 is formed such that each of the first and third surfaces 11 and 13 of the base plate 1 has a slit at the vicinity of corresponding proximal end. Similarly, the fourth notch 17 is formed such that each of the first and third surfaces 11 and 13 of the base plate 1 has a slit at the vicinity of corresponding distal end. A width of each slit is greater than or equal to a thickness of the radiation plate 3.

The first and third notches 14 and 16 that are positioned at the vicinity of the proximal end of the base plate 1 have a predefined gap between each other, such that the third notch 16 is positioned towards the proximal end of the base plate 1 and after the predefined gap the first notch 14 is positioned. Similarly, the second and fourth notches 15 and 17 that are positioned at the vicinity of the distal end of the base plate 1 have a predefined gap between each other, such that the fourth notch 17 is positioned towards the distal end of the base plate 1 and after the predefined gap the second notch 15 is positioned.

The radiation plate 2 has a first surface 21 that has a plurality of slots 22 to radiate a radio waves, and second and third surfaces 23 and 24 that form a horn shape. The first, second, and third surfaces 11, 12, and 13 of the base plate 1 and the first surface 21 of the radiation plate form a waveguide. In one embodiment, the waveguide thus formed is an elongated rectangular waveguide. The base plate 1 further includes a feed point 20 such that the radio waves are fed to the slot array antenna from the feed point 20. The feed point 20 is positioned at a center of the base plate 1. In one embodiment, the feed point 20 is positioned at a center of the third surface 13 of the base plate 1. The plurality of slots 22 in the first surface 21 of the radiation plate 2 have odd number of slots and each slot is formed at a predefined angle. In one embodiment, a slot angle of a center slot of the plurality of slots 22 and a distance to the feed point 20 are predetermined to feed each slot with a same phase of the radio waves.

Further, the radiation plate 2 has proximal and distal connecting members 25 and 26 bent in a direction opposite to a radiating direction of the radio waves at proximal and distal ends of the first surface 21 of the radiation plate 2, respectively. In one embodiment, the proximal and distal connecting members 25 and 26 of the radiation plate 2 have a rectangular shape. It will be apparent to a person skilled in the art that although in the current embodiment, the proximal and distal connecting members 25 and 26 of the radiation plate 2 have a rectangular shape, in various other embodiments, the proximal and distal connecting members 25 and 26 of the radiation plate 2 may have any suitable shape, without deviating from the scope of the present disclosure. A length of each of the proximal and distal connecting members 25 and 26 of the radiation plate 2 is less than or equal to a depth of the U-shape of the base plate 1.

The grating plate 3 has a grated surface 31 and proximal and distal connecting members 32 and 33 bent in a direction opposite to a radiating direction of the radio waves at proximal and distal ends of the grated surface 31 of the radiation plate 2, respectively. In one embodiment, the proximal and distal connecting members 32 and 33 of the grating plate 3 have a rectangular shape. It will be apparent to a person skilled in the art that although in the current embodiment, the proximal and distal connecting members 32 and 33 of the grating plate 3 have a rectangular shape, in various other embodiments, the proximal and distal connecting members 32 and 33 of the grating plate 3 may have any suitable shape, without deviating from the scope of the present disclosure. A length of each of the proximal and distal connecting members 32 and 33 of the grating plate 3 is greater than or equal to a depth of the U-shape of the base plate 1.

The base plate 1, the radiation plate 2, and the grating plate 3 are metal sheets that are bent and punched to shape to form desired design for the respective plates. In one embodiment, the base plate 1, the radiation plate 2, and the grating plate 3 are made out of same metal. In another embodiment, the base plate 1, the radiation plate 2, and the grating plate 3 are made out of different metals. In one embodiment, the base plate 1, the radiation plate 2, and the grating plate 3 have same thickness.

Figure 2:
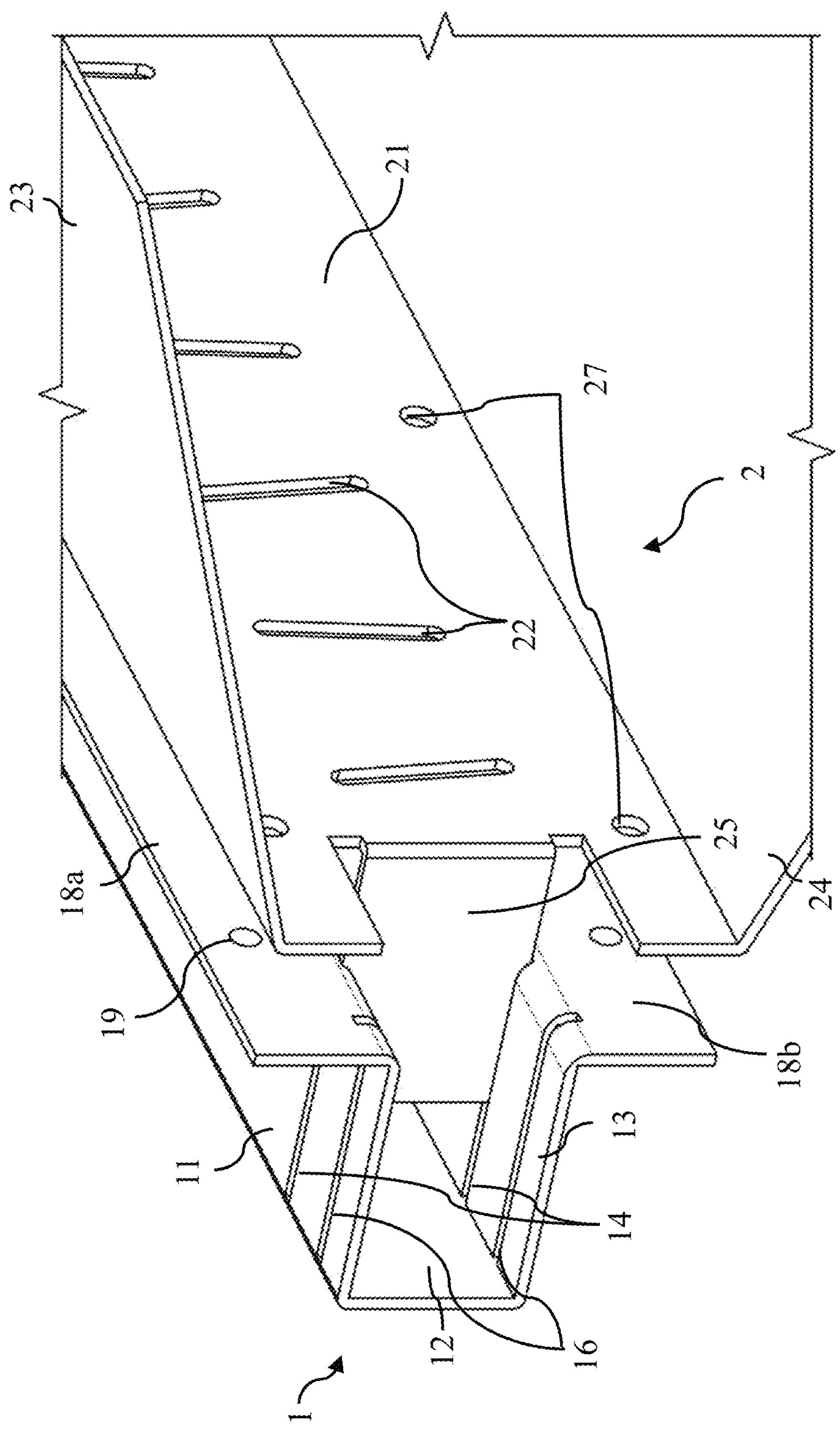
FIG. 2 illustrates coupling of the radiation plate with the base plate to assemble the slot array antenna according to one embodiment of the present disclosure.

FIG. 2 illustrates coupling of the radiation plate 2 with the base plate 1 to assemble the slot array antenna according to one embodiment of the present disclosure. The radiation plate 2 is coupled with the base plate 1 by way of the proximal and distal connecting members 25 and 26 of the radiation plate 2 and the first and second notches 14 and 15 of the base plate 1. In one embodiment, a distance of separation between the proximal and distal connecting members 25 and 26 of the radiation plate 2 is equal to a distance of separation between the first and second notches 14 and 15 of the base plate 1.

The proximal and distal connecting members 25 and 26 of the radiation plate 2 are removably insertable into the first and second notches 14 and 15, respectively, to assemble the slot array antenna for the radiation of the radio waves. In one embodiment, the proximal connecting member 25 of the radiation plate 2 is removably inserted in the first notch 14 of the base plate 1 by sliding the proximal connecting member 25 of the radiation plate 2 into the slits at the proximal end of the first and third surfaces 11 and 13 of the base plate 1 that form the first notch 14. Similarly, the distal connecting member 26 of the radiation plate 2 is removably inserted in the second notch 15 of the base plate 1 by sliding the distal connecting member 26 of the radiation plate 2 into the slits at the distal end of the first and third surfaces 11 and 13 of the base plate 1 that form the second notch 15. The proximal and distal connecting members 25 and 26 of the radiation plate 2 act as a short for the radio waves radiating out from the slots.

Figure 3:
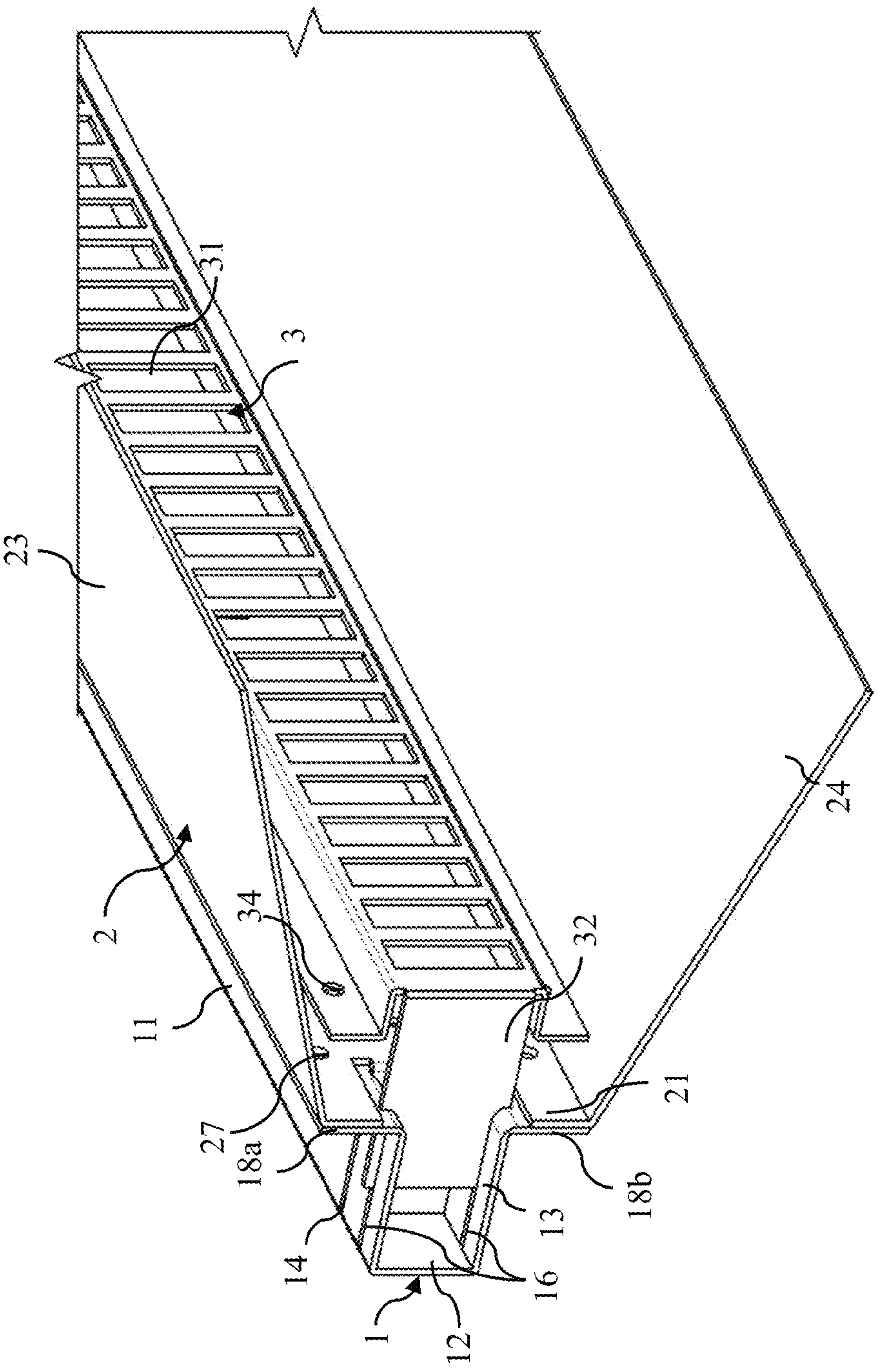
FIG. 3 illustrates coupling of the grating plate with the base plate to assemble the slot array antenna according to one embodiment of the present disclosure.

FIG. 3 illustrates coupling of the grating plate 3 with the base plate 1 to assemble the slot array antenna according to one embodiment of the present disclosure. The grating plate 3 is coupled with the base plate 1 by way of the proximal and distal connecting members 32 and 33 of the grating plate 3 and the third and fourth notches 16 and 17 of the base plate 1. In one embodiment, a distance of separation between the proximal and distal connecting members 32 and 33 of the grating plate 3 is equal to a distance of separation between the third and fourth notches 16 and 17 of the base plate 1. In one embodiment, the distance of separation between the proximal and distal connecting members 32 and 33 of the grating plate 3 is greater than distance of separation between the proximal and distal connecting members 25 and 26 of the radiation plate 2. Further, the distance of separation between the third and fourth notches 16 and 17 of the base plate 1 is greater than the distance of separation between the first and second notches 14 and 15 of the base plate 1

The proximal and distal connecting members 32 and 33 of the grating plate 3 are removably insertable into the third and fourth notches 16 and 17, respectively, to assemble the slot array antenna for the radiation of the radio waves and to suppress noise signals associated with the radiation of the radio waves. The noise signals are vertically polarized waves. In one embodiment, the proximal connecting member 32 of the grating plate 3 is removably inserted in the third notch 16 of the base plate 1 by sliding the proximal connecting member 32 of the grating plate 3 into the slits at the proximal end of the first and third surfaces 11 and 13 of the base plate 1 that form the third notch 16. Similarly, the distal connecting member 33 of the grating plate 3 is removably inserted in the fourth notch 17 of the base plate 1 by sliding the distal connecting member 33 of the grating plate 3 into the slits at the distal end of the first and third surfaces 11 and 13 of the base plate 1 that form the fourth notch 17. The grating plate 3 is utilized for cross polarization suppression.

Each of the base plate 1, the radiation plate 2, and the grating plate 3 have a plurality of holes 19, 27, and 34, respectively, for receiving fasteners to secure the base plate 1, the radiation plate 2, and the grating plate 3 to each other. Examples of fasteners utilized to secure the base plate 1, the radiation plate 2, and the grating plate 3 to each other include, but are not limited to, threaded fasteners such as screws, nuts, and bolts. In one embodiment, the base plate 1 has fourth and fifth surfaces **18*a* and 18*b* adjacent and perpendicular to the first and third surfaces 11 and 13 of the base plate 1, respectively. The fourth and fifth surfaces 18*a* and 18*b* include the plurality of holes 19. The first surface 21 of the radiation plate 2 includes the plurality of holes 27**.

Figure 4:
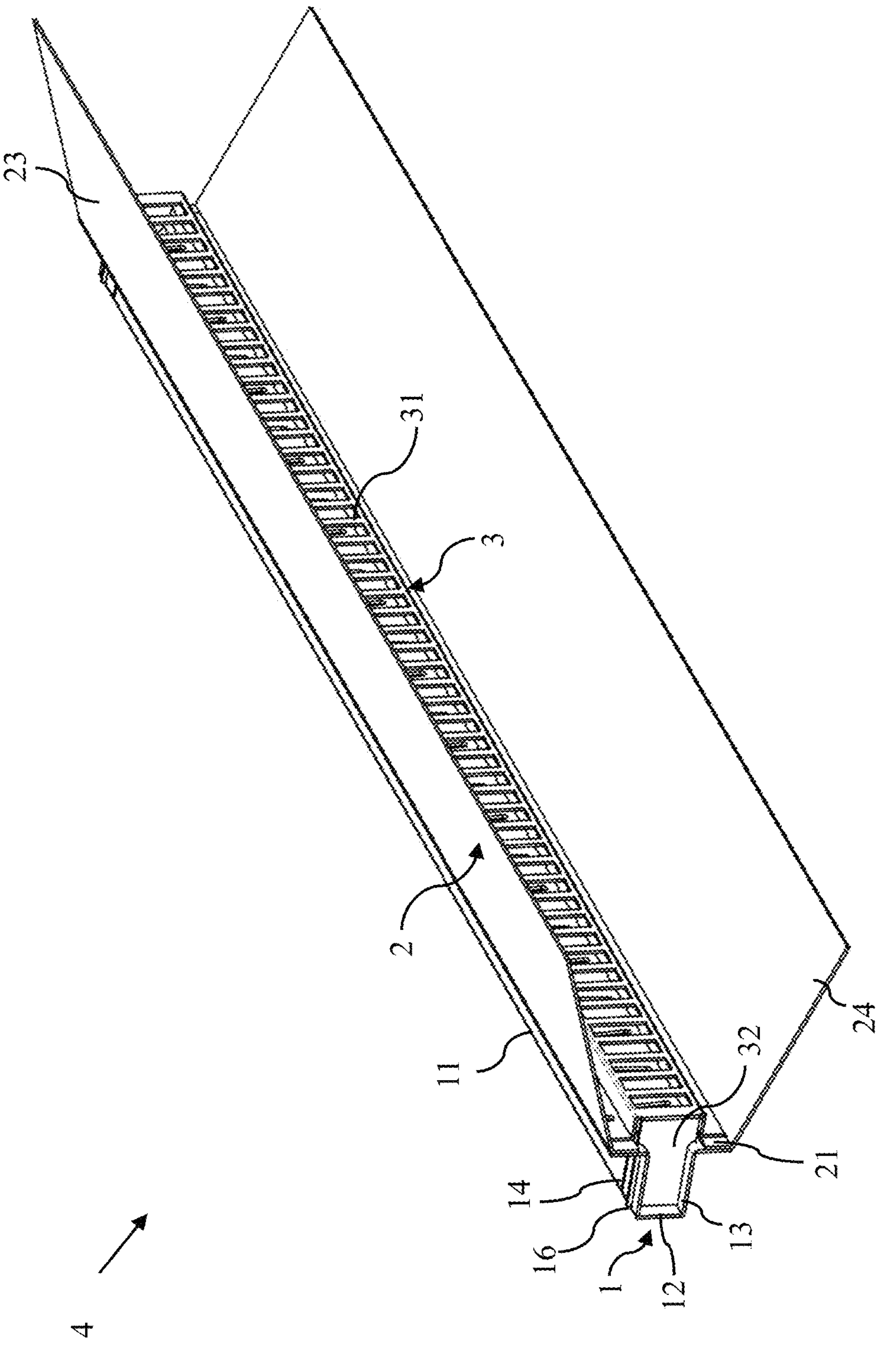
FIG. 4 illustrates the assembled slot array antenna according to one embodiment of the present disclosure.

FIG. 4 illustrates the assembled slot array antenna 4 according to one embodiment of the present disclosure. The base plate 1, the radiation plate 2, and the grating plate 3 are assembled as described in FIGS. 2 and 3 to form the slot array antenna 4. The slot array antenna 4 is used to radiate the radio waves for a radio detection and ranging (RADAR) device used for navigation of a ship. The radiation plate 2 is assembled with the base plate 1 as described in FIG. 2 by way of the first and second notches 14 and 15 and the proximal and distal connecting members 25 and 26 of the radiation plate 2. The grating plate 3 is assembled with the base plate 1 as described in FIG. 3 by way of the third and fourth notches 16 and 17 and the proximal and distal connecting members 32 and 33 of the grating plate 3. The base plate 1, the radiation plate 2, and the grating plate 3 are secured to each other by utilizing the fasteners through the plurality of holes 19, 27, and 34.

As the radiation plate 2 has the proximal and distal connecting members 25 and 26 that act as the short for the radio waves, the slot array antenna 4 may be utilized as a resonant type. It will be understood by a person skilled in the art that if an absorber is attached to the radiation plate 2, the slot array antenna 4 may be utilized as a travelling wave type.

A size (i.e., a height) of the waveguide formed by the first, second, and third surfaces 11, 12, and 13 of the base plate 1 and the first surface 21 of the radiation plate 2 is extended to a height where the higher order mode of the radio waves does not occur. A contact position of the base plate 1 with the radiation plate 2 is extended up and down at bending (i.e., the fourth and fifth surfaces **18*a* and 18*b* of the base plate 1**)

to obtain the half wavelength of the slot. As a result, it is not necessary to cut a slot in the bent part, and machining becomes easy. Thus, ease of assembly and stability of mounting are achieved with the slot array antenna 4 of the present disclosure.

Figure 5:
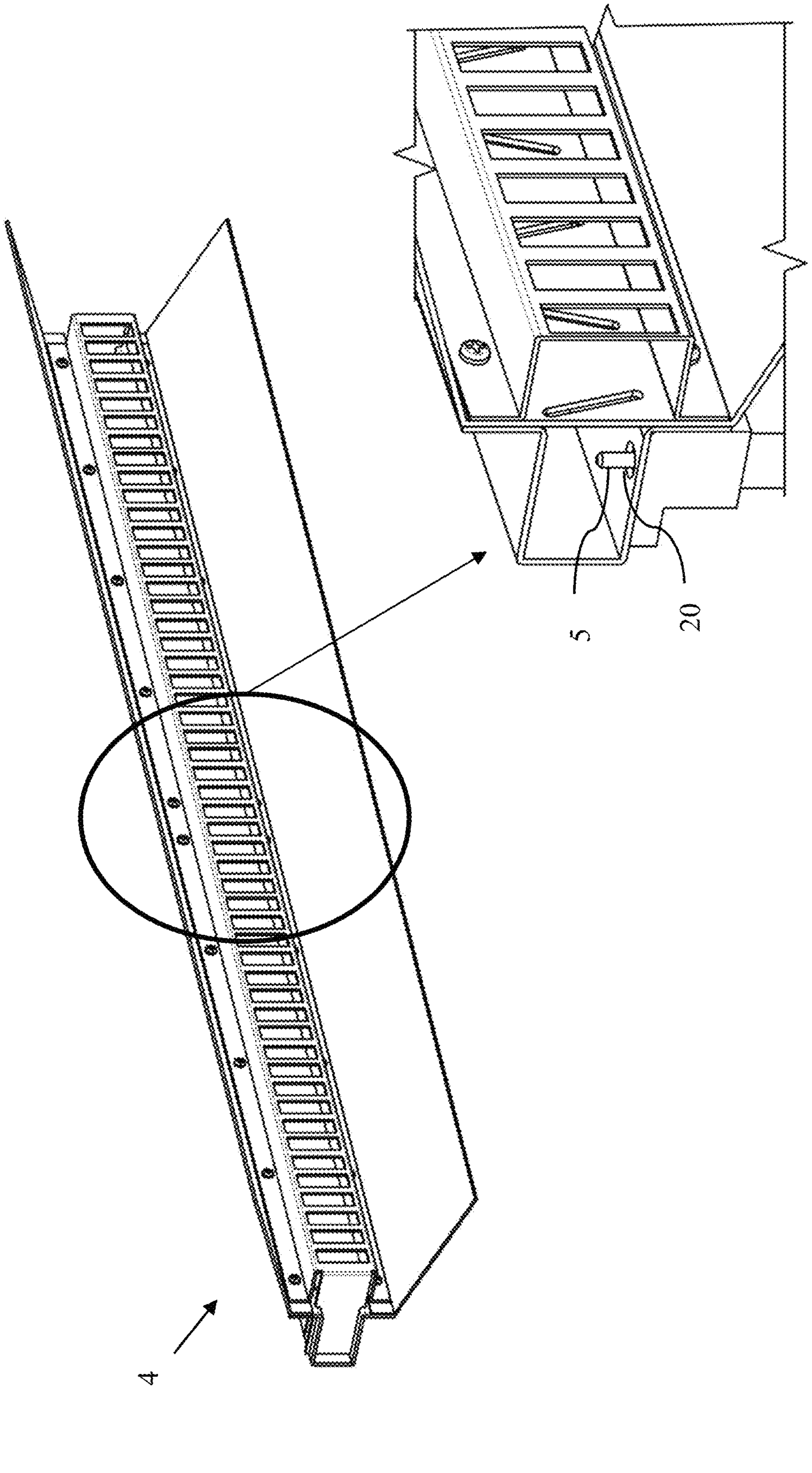
FIG. 5 illustrates a cross sectional view of the slot array antenna according to one embodiment of the present disclosure.
Figure 6:
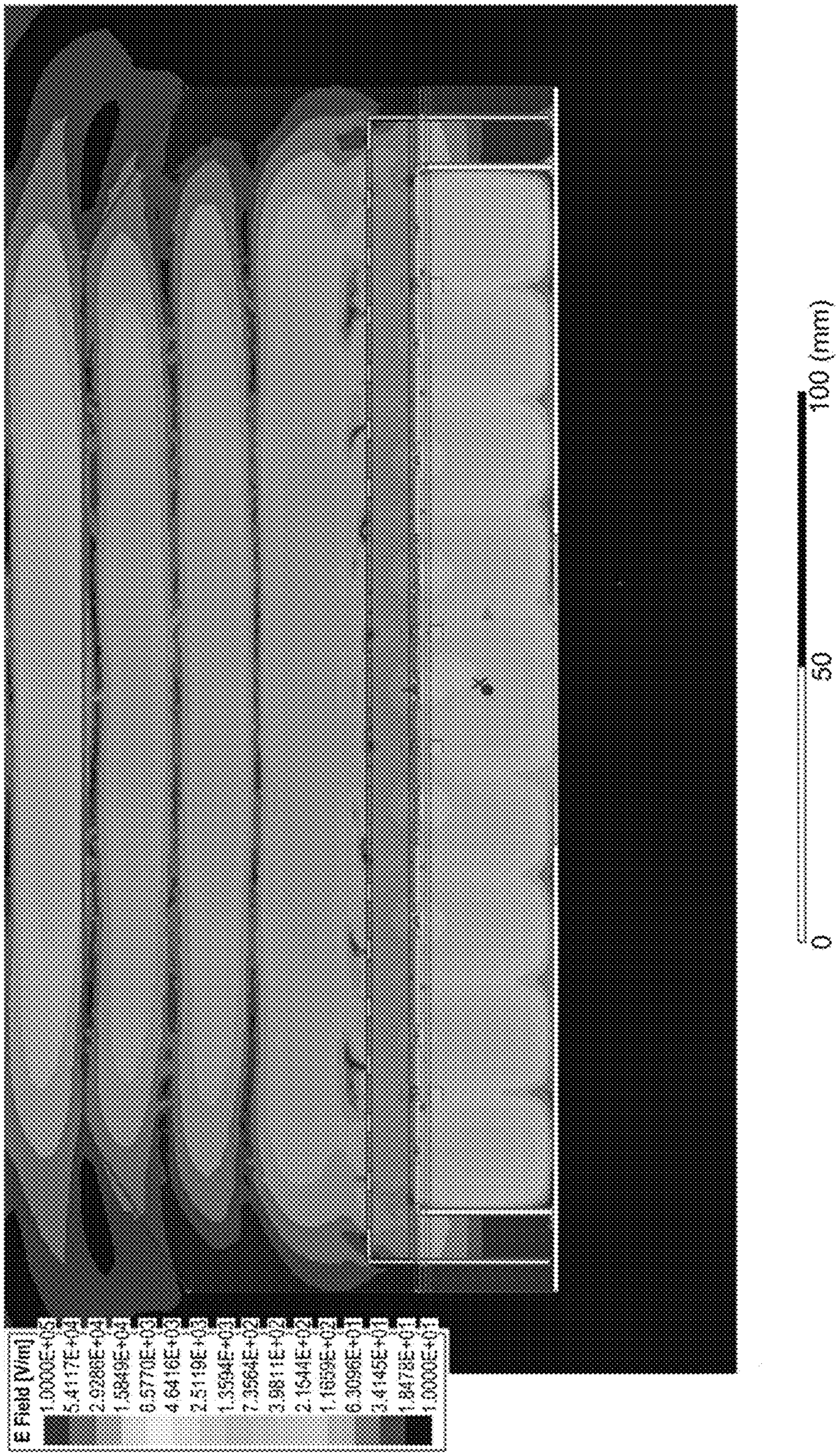
FIG. 6 illustrates a radiation pattern associated with the radiation of radio waves according to one embodiment of the present disclosure.

FIG. 5 illustrates a cross sectional view of the slot array antenna 4 according to one embodiment of the present disclosure. The cross-sectional view of the assembled slot array antenna 4 is fed with the plurality of radiation waves by way of a feeder 5 positioned at the feed point 20. The slot array antenna 4 is a resonant slot array antenna shorted at both ends by way of the proximal and distal connecting members 25 and 26, and the number of slots of the plurality of slots 22 is an odd number, and a slot is also provided in the vicinity of the feed point 20. The slot angle of the centre slot and the distance to the feed point 20 are adjusted so as to obtain a desired weight while feeding each slot in the same phase of the radio waves. FIG. 6 illustrates a radiation pattern 6 associated with the radiation of radio waves according to one embodiment of the present disclosure.

Figure 7:
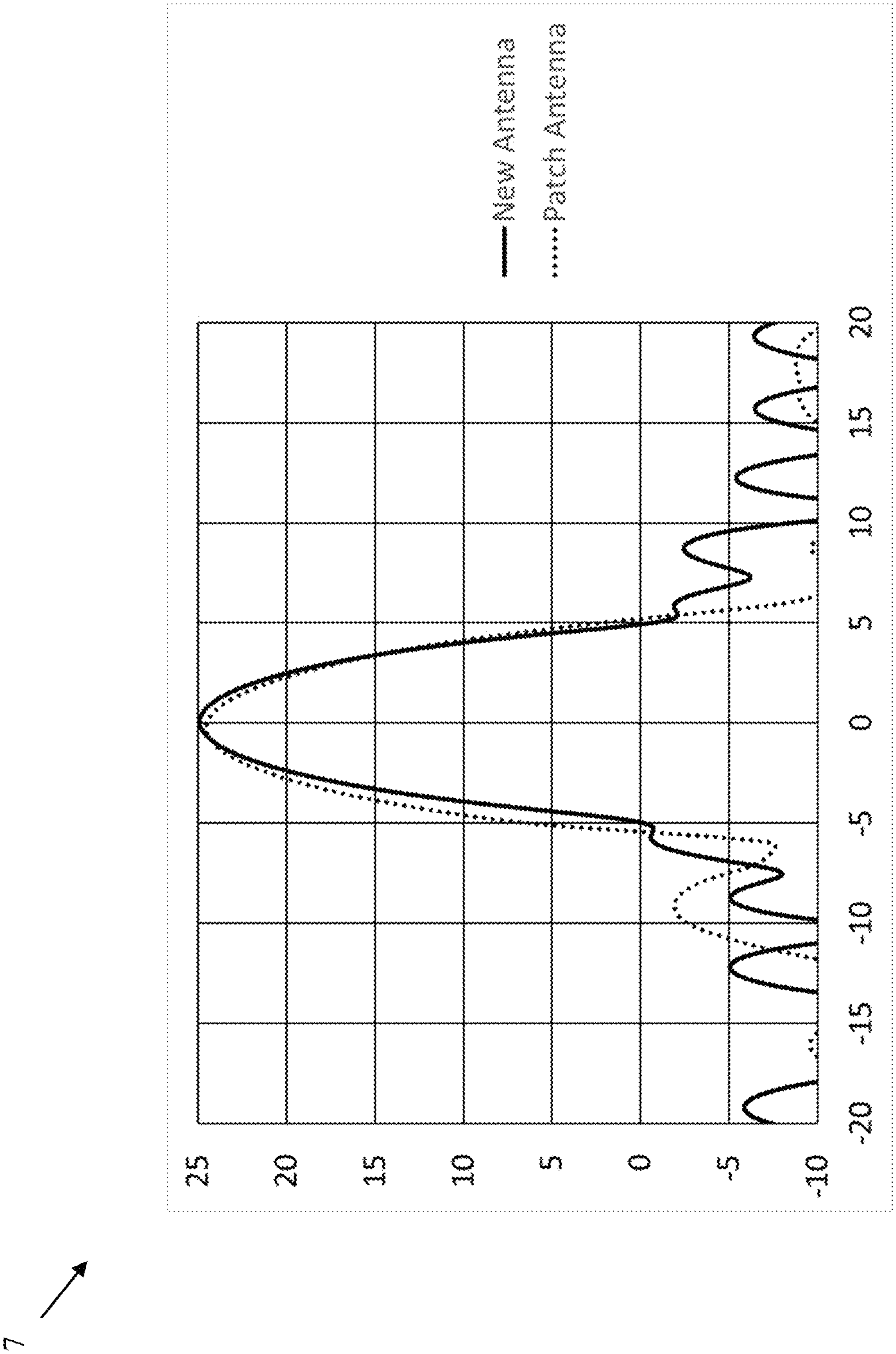
FIG. 7 is a graph illustrating a comparison between gains of the slot array antenna and a patch antenna according to one embodiment of the present disclosure.

FIG. 7 is a graph illustrating a comparison between gains of the slot array antenna 4 and a patch antenna (conventional) according to one embodiment of the present disclosure. When a gain of the slot array antenna 4 of the present disclosure compared with that of the conventional patch antenna of the same size, the gain of the slot array antenna 4 is higher.

Figure 8:
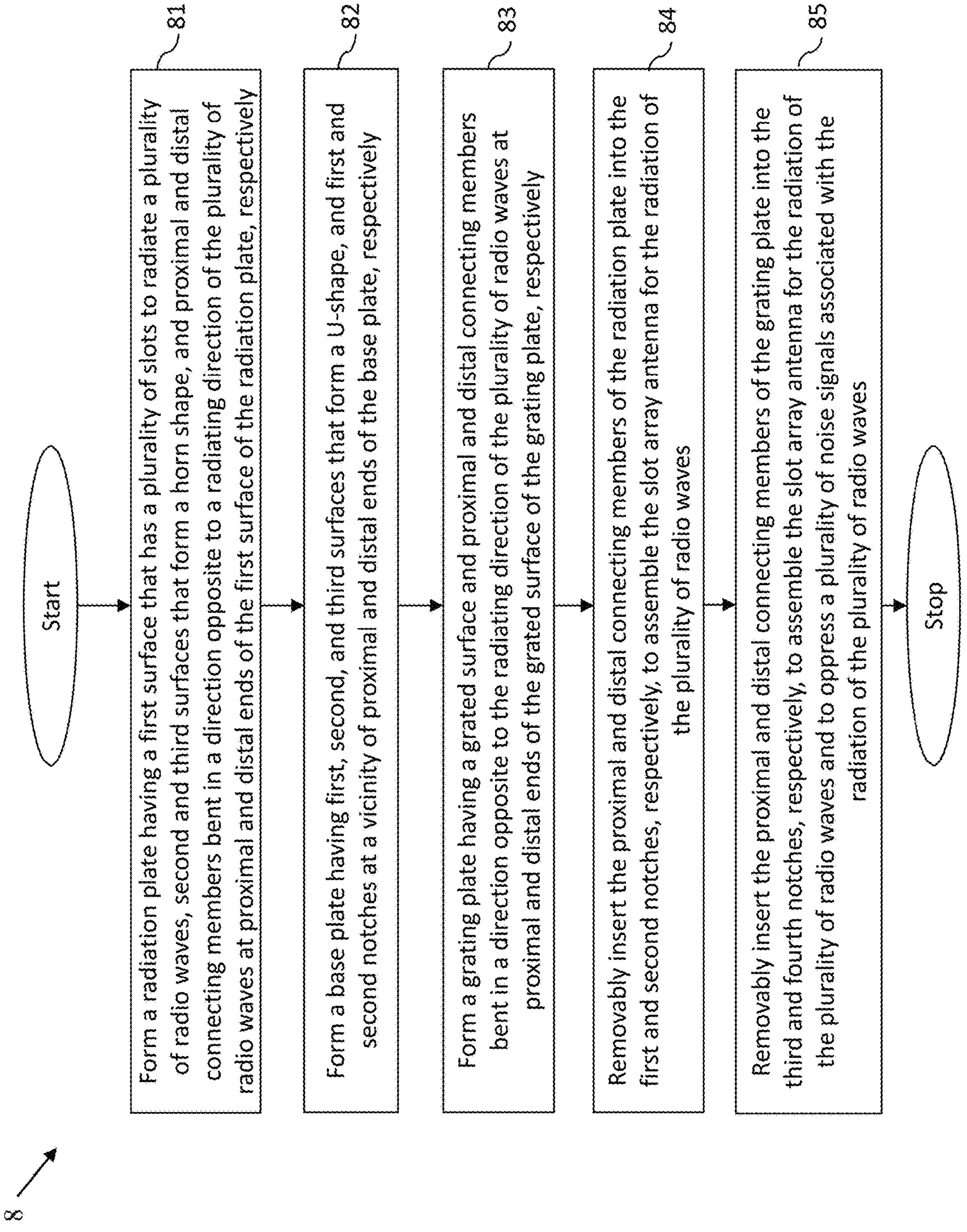
FIG. 8 represents a flow chart illustrating a method for assembling a slot array antenna according to one embodiment of the present disclosure.

FIG. 8 represents a flow chart illustrating a method 8 for assembling a slot array antenna according to one embodiment of the present disclosure.

At step 81, the radiation plate 2 is formed having the first surface 21 that has the plurality of slots 22 to radiate the radio waves, the second and third surfaces 23 and 24 that form a horn shape, and the proximal and distal connecting members 25 and 26 bent in a direction opposite to a radiating direction of the radio waves at proximal and distal ends of the first surface 21 of the radiation plate 2, respectively.

At step 82, the base plate 1 is formed having the first, second, and third surfaces 11, 12, and 13 that form a U-shape, and the first and second notches 14 and 15 at a vicinity of the proximal and distal ends of the base plate 1, respectively At step 83, the grating plate 3 is formed having the grated surface 31 and the proximal and distal connecting members 32 and 33 bent in a direction opposite to the radiating direction of the radio waves at the proximal and distal ends of the grated surface 31 of the grating plate 3, respectively. The base plate 1 further has the third and fourth notches 16 and 17 at a vicinity of the proximal and distal ends of the base plate 1, respectively.

At step 84, the proximal and distal connecting members 25 and 26 of the radiation plate 2 are removably insertable into the first and second notches 14 and 15, respectively, to assemble the slot array antenna 4 for the radiation of the radio waves. The radio waves are radiated between the horn shape.

At step 85, the proximal and distal connecting members 32 and 33 of the grating plate 3 into the third and fourth notches 16 and 17, respectively, to assemble the slot array antenna 4 for the radiation of the radio waves and to suppress noise signals associated with the radiation of the radio waves.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A slot array antenna, comprising:

a radiation plate having:

a first surface that has a plurality of slots configured to radiate radio waves in a radiating direction, second and third surfaces attached to the first surface and that form a horn shape, wherein the second surface is in a plane that forms a non-zero acute angle above the radiating direction, and the third surface is in a plane that forms the non-zero acute angle below the radiating direction, and first and second connecting members extending away from the first surface of the radiation plate in a direction opposite to the radiating direction, the first and second connecting members of the radiation plate being flat quadrilaterals located at respective ends of the first surface of the radiation plate, the first and second connecting members of the radiation plate being located on respective planes that are perpendicular to a central axis of a waveguide; and a base plate having:

first, second, and third surfaces that form a U-shape, with the first and third surfaces of the base plate being parallel to each other, and first and second notches at positions inset a first predetermined distance from respective ends of each of the first and third surfaces of the base plate, wherein a distance between the first and second notches of the base plate is equal to a distance between the first and second connecting members of the radiation plate, wherein the first and second connecting members of the radiation plate are removably insertable into respective ones of the first and second notches in the direction opposite to the radiating direction of the radio waves, wherein the first, second, and third surfaces of the base plate and the first surface of the radiation plate form the waveguide, and wherein the first and second connecting members of the radiation plate are configured to act as a short for the radio waves radiating out from the slots.

2. The slot array antenna of claim 1, wherein the first and second connecting members of the radiation plate have a rectangular shape.

3. The slot array antenna of claim 1, wherein a length of each of the first and second connecting members of the radiation plate is less than or equal to a depth of the U-shape of the base plate.

4. The slot array antenna of claim 1, wherein the base plate further has third and fourth notches at positions inset a second predetermined distance from the respective ends of each of the first and third surfaces of the base plate, the second predetermined distance being shorter than the first predetermined distance.

5. The slot array antenna of claim 4, further comprising:

a grating plate having a grated surface and first and second connecting members extending away from the grated surface of the grating plate in the direction opposite to the radiating direction, the first and second connecting members of the grating plate being flat quadrilaterals located at respective at ends of the grated surface of the grating plate, the first and second connecting members of the grating plate being located on respective planes that are perpendicular to the central axis of the waveguide, wherein a distance between the third and fourth notches of the base plate is equal to a distance between the first and second connecting members of the grating plate, wherein the first and second connecting members of the grating plate are removably insertable into respective ones of the third and fourth notches to assemble the slot array antenna for the radiation of the radio waves, wherein the first and second connecting members of the grating plate are configured to suppress noise signals associated with the radiation of the radio waves.

6. The slot array antenna of claim 5, wherein the noise signals are vertically polarized waves.

7. The slot array antenna of claim 5, wherein each of the base plate, the radiation plate, and the grating plate have a plurality of holes for receiving fasteners to secure the base plate, the radiation plate, and the grating plate to each other.

8. The slot array antenna of claim 1, wherein the base plate is provided with a feed point from where the radio waves are fed to the slot array antenna.

9. The slot array antenna of claim 8, wherein the feed point is positioned at a center of the base plate.

10. The slot array antenna of claim 9, wherein a slot angle of a center slot of the plurality of slots and a distance to the feed point are predetermined to feed each slot with a same phase of the radio waves.

11. The slot array antenna of claim 1, wherein the plurality of slots in the first surface of the radiation plate have an odd number of slots.

* * * * *